(12) United States Patent
Stark et al.

(10) Patent No.: US 6,359,037 B1
(45) Date of Patent: Mar. 19, 2002

(54) POLYAMINE/EPOXY-FUNCTIONAL AMIDOAMINE PRODUCT WITH EPOXY RESIN

(76) Inventors: Charles J. Stark, deceased, late of Houston, TX (US), by Ann Elizabeth Stark, administrator of the Estate; Gayle Edward Back, 7810 Tarik Dr., Houston, TX (US) 77083; Jimmy D. Elmore, 719 Electra Dr., Houston, TX (US) 77079; Kalyan Ghosh, 7110 Harpers Dr., Richmond, TX (US) 77469; Pen-Chung Wang, 13606 Pinerock La., Houston, TX (US) 77079; Kailash Dangayach, 755 Windbreak Trail, Houston, TX (US) 77097

(*) Notice: Subject to any disclaimer, the term of this patent is extended or adjusted under 35 U.S.C. 154(b) by 27 days.

(21) Appl. No.: 09/635,909

(22) Filed: Aug. 10, 2000

Related U.S. Application Data

(62) Division of application No. 09/095,079, filed on Jun. 10, 1998, now Pat. No. 6,277,928.
(60) Provisional application No. 60/076,635, filed on Mar. 3, 1998.

(51) Int. Cl.[7] ................... C08G 59/14; C08L 63/02; C08K 3/20
(52) U.S. Cl. .................. 523/404; 523/414; 525/423
(58) Field of Search .................. 523/404, 414, 523/417; 525/423, 438

(56) References Cited

U.S. PATENT DOCUMENTS

| 5,017,675 A | 5/1991 | Marten et al. ............... 528/111 |
| 5,032,629 A | 7/1991 | Hansen et al. ............... 523/414 |
| 5,118,729 A | 6/1992 | Piechocki .................... 523/404 |
| 5,204,385 A | 4/1993 | Naderhoff .................... 523/417 |
| 5,319,004 A | 6/1994 | Marten et al. ............... 523/404 |
| 5,369,152 A | 11/1994 | Naderhoff et al. .......... 523/415 |
| 5,382,606 A | 1/1995 | Butikofer .................... 523/404 |
| 5,489,630 A | 2/1996 | Walker ....................... 523/404 |
| 5,643,976 A | 7/1997 | Arora et al. ................. 523/404 |
| 5,750,595 A | 5/1998 | Arora et al. ................. 523/404 |
| 5,786,429 A | 7/1998 | Allen ......................... 525/430 |

FOREIGN PATENT DOCUMENTS

| JP | 06287276 A | 10/1994 |

*Primary Examiner*—Robert E. L. Sellers

(57) ABSTRACT

An aqueous system comprises at least one epoxy resin and a reaction product with an amine equivalent weight of at least 50 prepared by the reaction of an (A) epoxy-functional amidoamine derived from at least one epoxy resin and an amidoamine obtained via the reaction of an acid-terminated polyalkylene glycol and a diamine in an active hydrogen:epoxy groups ratio of from 1:15 to 1:350, with (B) at least one polyamine in an active amine hydrogen:epoxy groups equivalent ratio of from 2:1 to 30:1, and, optionally (C) a monoepoxide in a remaining active amine hydrogen:epoxy groups equivalent ratio of from 5:1 to 20:1.

5 Claims, No Drawings

POLYAMINE/EPOXY-FUNCTIONAL AMIDOAMINE PRODUCT WITH EPOXY RESIN

This is a continuation division continuation-in-part of application Ser. No. 09/095,079 filed Jun. 10, 1998, U.S. Pat. No. 6,277,928, which is a continuation of a provisional Application Serial No. 60/076,635 filed Mar. 3. 1998, the entire disclosure of which is hereby incorporated by reference.

FIELD OF INVENTION

This invention relates to curing agents for epoxy resins. In one aspect, the invention relates to curing agents suitable for use in waterborne applications.

BACKGROUND OF THE INVENTION

Epoxy coating systems cured with polyamine-based curing agents are used for the preparation of industrial maintenance coatings and other types of protective coatings for a variety of substrates. Epoxy resins have excellent resistance to chemicals also have good adhesion to most substrates, e.g. various woods, wall-boards, metals and masonry surface.

There has long been a desire to formulate a curing agent which is essentially free of volatile organic compounds (VOC's), which is self emulsifiable and curable at a wide range of temperatures in the absence of external accelerators if possible.

Many of the current waterborne epoxy resins and curing agents are plagued with the problem of poor film properties because the surfactants tend to migrate to the surface during the cure of the resin system. Thus, it would be desirable to provide a curing agent system containing a surfactant which does not migrate during cure, that is, a self emulsifiable system which does not require salting the surfactant, e.g. with acids, or using plasticizers to stably disperse the curing agent in water.

In addition to providing a self emulsifiable waterborne curing agent, the curing agent should be readily compatible with a waterborne epoxy resin in order to make a coating having good mechanical properties and weatherability. A waterborne curing agent that does not have good compatibility with the epoxy resin will not coalesce well when applied onto a substrate. The problem of compatibility is more acute where the curing agent primary amine groups have been converted to secondary amine groups to reduce the blooming or hazing phenomena.

Due to more stringent environmental regulations particularly with respect to reduced volatile organic compounds (VOC), toxicity, etc. aqueous based coating systems (waterborne epoxy resin systems) are receiving significant attention in terms of research and development efforts.

These curing agents for waterborne epoxy resins are typically water-dilutable polyamines that are either inherently water soluble or whose water solubility is enhanced by means of reaction with an organic acid such as acetic acid. Those that are highly water compatible provide for coatings which exhibit water sensitivity and poor protection from corrosion.

For example, in U.S. Pat. No. 5,489,630 describes a waterborne curing agent based on low molecular weight polyetheramine are water soluble. These low molecular weight polyetheramine have high levels of water-soluble polyethers which may lower the aqueous chemical resistance of paints.

It is desirable to obtain curing agents that are incompatible with water but in dispersible in water and further can be water dispersible without the aid of an acid.

SUMMARY OF THE INVENTION

According to the invention, a curing agent for epoxy resins is provided, comprising a reaction product having an amine equivalent weight of at least 50 prepared by the steps comprising reacting (a) an epoxy-functional compound prepared by reacting an amidoamine having the formula:

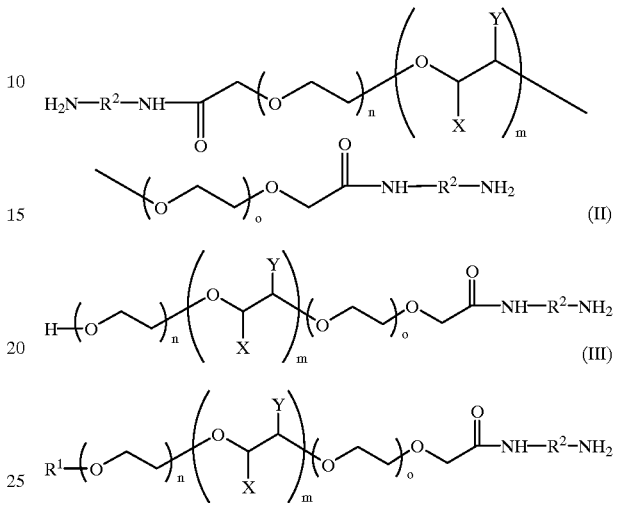

wherein $R^1$ is an alkyl, aryl, or arylalkyl group having 1 to 15 carbon atoms, preferably $C_{1-4}$ alkyl or nonylphenyl, most preferably methyl, $R^2$ is aliphatic, cycloaliphatic, or aromatic group having 2 to 18 carbon atoms optionally containing non-reactive oxygen or at most an average of 4 secondary and/or tertiary nitrogen atoms per structure in the backbone, X and Y are independently a hydrogen, methyl or ethyl group with the provision that if X is methyl or ethyl, Y is hydrogen or if Y is methyl or ethyl, X is hydrogen, and n+m+o is a real number from 65 to 200, and n, m, and o are each a real number such as to provide a number average molecular weight of the amidoamine from 3000 to 10,000, and n+o is within the range of from 80 percent to 100 percent of n+m+o, in a ratio of (I) to (II) by weight in the range of 100:0 to 0:100, in a ratio of (I) to (III) by weight in the range of 100:0 to 0:100, and in a ratio of (II) to (III) by weight in the range of 100:0 to 0:100, and at least one epoxy resin having a functionality of from 1.5 to 2.5 epoxide group per molecule in an active amine hydrogen atoms to epoxy groups ratio of from 1:350 to 1:15; and (b) at least one polyamine in an active amine hydrogen atoms to epoxy groups ratio of 2:1 to 30:1 thereby producing an amine-terminated product having a amine equivalent weight of at least 50.

DETAILED DESCRIPTION OF THE INVENTION

There has been found that a certain amidoamine-based curing agent is dispersible in water without an acid, thus providing a superior curing agent for waterborne epoxy coatings formulations. Further, the curing agent of the invention requires only small amounts of surfactant based on solids. The curing agents of this invention when combined with a solid epoxy dispersion give coatings with good impact resistance, high gloss and gloss retention.

The waterborne curing agent composition of the invention is a solid phase dispersed in a continuous phase, the continuous phase comprising water, the solid phase comprising a curing agent composition and a surfactant composition. The dispersion can be a suspension, emulsion, or a colloidal dispersion. The aqueous continuous phase can contain other liquids in admixture, but is preferably free of any VOC's and free of any cosolvents. By an continuous phase that is essentially free of VOC's is meant that 5 wt. % or less of the waterborne curing agent composition is a VOC.

The curing agent of the invention can be produced by reacting a certain epoxy-functional component (a) and at least one certain polyamine component (b). The epoxy-functional component (a) can be prepared by reacting an amidoamine having the formula:

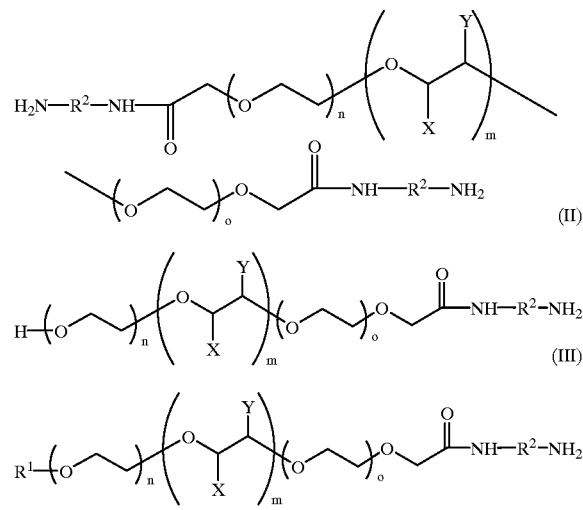

wherein $R^1$, $R^2$, n, and o are as described above, and X and Y are independently a hydrogen, methyl or ethyl group with the provision that if X is methyl or ethyl, Y is hydrogen or if Y is methyl or ethyl, X is hydrogen. Particularly, n, m, and o are each a real number such as to provide a number average molecular weight of the amidoamine from 3000, preferably from 4000, to 10,000, preferably to 6000, n+o is preferably in the range of from 80 percent, more preferably from 90 percent, to 100 percent of n+m+o. In a preferred embodiment, the ratio of n+o to m is in the range of 100:1 to 55:45.

In formula (I), preferably m is a real number from 0 to 70 and n and o are independently a real number from 5 to 395. In formula (II), preferably m is a real number from 0 to 70, n is a real number from 0 to 395, and o is a real number from 0 to 400, more preferably from 20 to 380. In formula (III), preferably m is a real number from 0 to 70, n is a real number from 0 to 395, and o is a real number from 0 to 400, more preferably from 20 to 380. In all of the above formulae (I), (II), and (III), n+o must be a real number in an amount effective to provide resin emulsification which is typically at least 15, preferably at least 35. In one preferred embodiment, m is 0.

In one embodiment, the epoxy-functional component (a) can be prepared by reacting amidoamine of structures (I) and (II) in a ratio of (I) to (II) by weight in the range of 99:1 to 1:99, preferably in the range of 20:80 to 80:20, and at least one epoxy resin. In another embodiment, the epoxy functional component can be prepared by reacting amidoamine of structures (II) and (III) in a ratio of (II) to (III) by weight in the range of 99:1 to 1:99, preferably in the range of 20:80 to 80:20, and at least one epoxy resin. In yet another embodiment, the epoxy functional component can be prepared by reacting amidoamine of structures (I) and (III) in a ratio of (I) to (III) by weight in the range of 99:1 to 1:99, preferably in the range of 20:80 to 80:20, and at least one epoxy resin. Further, the epoxy functional component can be prepared by reacting amidoamine of structures (I), (II) and (III) in an amount of 4 to 98 percent by weight of (I), 1 to 95 percent by weight of a (II), and 1 to 95 percent by weight of (III) with an epoxy resin.

The amidoamine is contacted with the epoxy resin having a functionality of from 1.5 to 2.5 epoxide group per molecule under conditions effective to react the amine group and the epoxide group. Typically, the ratio of active amine hydrogen atoms to epoxy groups ratio is form 1:350, preferably from 1:100, to 1:15, preferably to 1:25. The reaction is typically carried out at a temperature from ambient temperature to an elevated temperature sufficient to react the amine group and the epoxide group preferably in the range of from 50° C. to 150° C. for a time effective to produce the reaction products. The progress of the reaction can be monitored and targeted to produce the desired product by measuring the amine equivalent weight and the epoxy equivalent weight of the reactant mixture. Generally, the reaction mixture is heated until the epoxy equivalents equal to the amine equivalents added are consumed which is generally one hour or greater. More than one epoxy resin can be reacted with the amidoamine For illustrative purposes, one embodiment of the epoxy functional component (a) useful in the invention can be represented as a composition comprising an epoxy-terminated compound having the simplified formula:

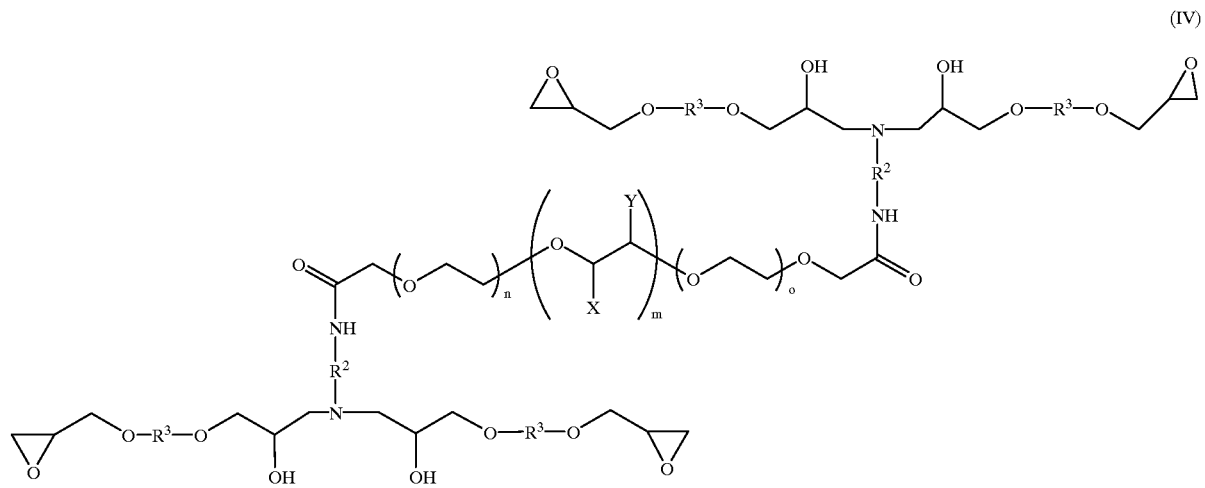

wherein R², R³, X, Y, n, m, and o are as described above.

For further illustrative purposes, another embodiment of the epoxy functional component (a) useful in the invention can be represented as an epoxy-terminated compound having the simplified formula:

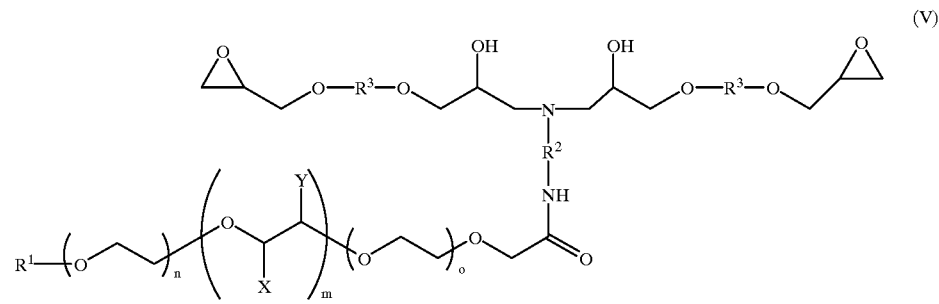

(V)

wherein R₁, R², R³, X Y, n, m, and o are as described above.

In order to simplify the illustration those curing agents using the multifunctional epoxy resin or a polyamine having more than 4 amine hydrogen functionality is not illustrated as the structure, but are included in the invention.

The curing agent of the invention can be produced by reacting the epoxy-functional component (a) and at least one polyamine component (b) in an active amine hydrogen atoms to epoxy groups ratio of 2:1, preferably 5:1, to 30:1, preferably to 15:1 thereby producing an amine-terminated product. The curing agent of the invention have an amine equivalent weight of at least 50, preferably at least 65, more preferably at least 100, preferably to 400.

For illustrative purposes, one embodiment of the amine-terminated product comprises a reaction product of component (a) and component (b) having the simplified formula:

(VI)

wherein R², R³, m, n, o, X and Y are independently as defined above and R⁴ is an aliphatic, cycloaliphatic, or aromatic group having 2 to 18 carbon atoms optionally containing non-reactive oxygen or at most an average of 4 secondary and/or tertiary nitrogen atoms per structure in the backbone.

For illustrative purposes, another embodiment of the amine-terminated product comprises a reaction product of component (a) and component (b) having the simplified formula:

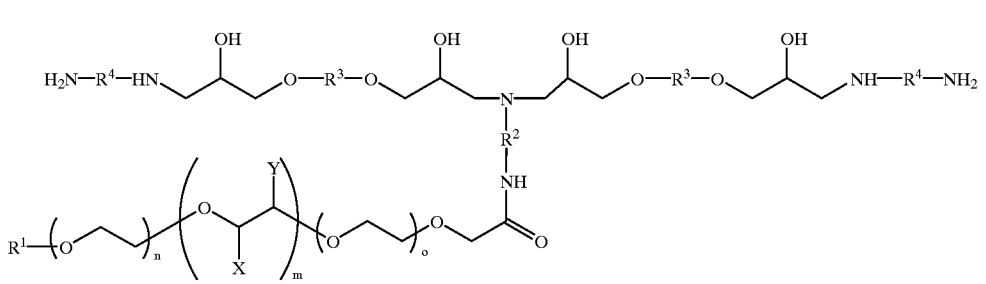

(VII)

wherein $R^1$, $R^2$, $R^3$, m, n, o, X and Y are independently as defined above and $R^4$ is an aliphatic, cycloaliphatic, or aromatic group having 2 to 18 carbon atoms optionally containing non-reactive oxygen or at most an average of 4 secondary and/or tertiary nitrogen atoms per structure in the backbone.

If desired, $R^2$ and $R^4$ can be the same or different groups.

If desired, the amine-terminated product can be reacted with (c) a monoepoxy in a remaining active amine hydrogen atoms to epoxy groups ratio of 5:1, preferably of 10:1, to 20:1, preferably to 15:1 to provide a capped product.

If desired, the amine-terminated product can be capped with a monoepoxy by reacting the compounds under conditions effective to react the remaining active amine hydrogen atoms with the epoxy groups either before or after dispersion. The reaction is typically carried out at a temperature within the range from 50° C. to 100° C. for a time effective to produce the reaction products. Generally, the reaction mixture is heated until the amine equivalents consumed are equal to the epoxy equivalents (essentially all the epoxy groups are consumed).

The preferred polyamine can be represented by the formula:

$$H_2N—R^Z—NH_2 \quad (VIII)$$

wherein Z is 2 or 4 and $R^Z$ is aliphatic, cycloaliphatic, or aromatic group having 2 to 18 carbon atoms optionally containing non-reactive oxygen or at most an average of 4 secondary and/or tertiary nitrogen atoms per structure in the backbone. Examples of suitable diamines include, for example, m-xylylenediamine, 1,3-bisaminomethylcyclohexane, 2-methyl-1,5-pentanediamine, 1-ethyl-1,3-propanediamine, ethylenediamine, diethylenetriamine, triethylenetetramine, polyoxypropylenediamines, 2,2(4),4-trimethyl-1,6-hexanediamine, isophorone diamine, 2,4(6)-toluenediamine, 1,6-hexanediamine 1,2-diaminocyclohexane, para-amiodicyclohexyl methane (PACM), and 1,8-diamino-3,6-dioxooctane.

The epoxy-functional compound can be prepared by contacting the amidoamine with the epoxy resin under conditions effective to react the amine group and the epoxide group. The reaction is typically carried out at a temperature from ambient temperature to an elevated temperature sufficient to react the amine group and the epoxide group preferably within the range of from 50° C. to 150° C. for a time effective to produce the reaction products. The progress of the reaction can be monitored and targeted to produce the desired product by measuring the amine equivalent weight and the epoxy equivalent weight of the reactant mixture. Generally, the reaction mixture is heated until the epoxy equivalents equal to the amine equivalents added are consumed which is generally one hour or greater.

The preferred amidoamine is prepared by reacting an acid-terminated polyalkyleneglycol-containing compound having the formula:

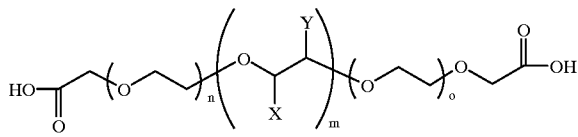

(I)

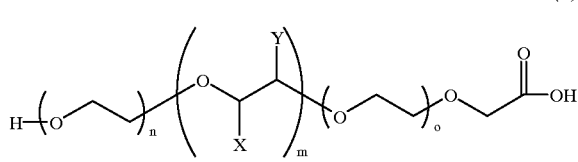

(II)

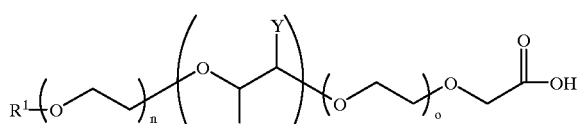

(III)

wherein $R^1$, X, Y, n, m, and o are as described above, and at least one diamine in an amine to acid equivalent ratio of 6:1 to 25:1 until essentially all of the acid group is consumed, in a ratio of (I) to (II) by weight in the range of 100:0 to 0:100, a ratio of (I) to (III) by weight in the range of 100:0 to 0:100, and in a ratio of (II) to (III) in the range of 100:0 to 0:100.

The acid-terminated polyalkyleneglycol-containing compound can be produced by oxidation of a polyethylene glycol monoalkylether or a monoalkylether of a block copolymer of ethylene oxide and propylene oxide or butylene oxide ("polyalkylene glycol") or by at least a partial oxidation of a polyethylene glycol, or a block copolymer of ethylene oxide and propylene oxide or polybutylene oxide ("polyalkylene glycol").

Polyalkylene glycols generally contain a distribution of compounds with a varying number of oxyethylene units, n or o and/or oxypropylene or oxybutylene units, m. Generally, the quoted number of units is the whole number closest to the statistical average, and the peak of the distribution. Positive real number as used herein refers to a number which is positive and includes integers and fractions of integers.

The acid-terminated polyalkyleneglycol-containing compounds can be produced by oxidation of the polyalkylene glycols including, but not limited to, the processes described in U.S. Pat. Nos. 5,250,727 and 5,166,423. Generally, oxygen-containing gas is added to the polyalkylene glycol in the presence of a free radical (e.g., 2,2,6,6-tetramethyl-1-piperidinyloxy) and an inorganic acid (e.g., nitric acid) to produce the carboxylic acid until at least one hydroxyl group per molecule, or if diacid-terminated polyalkyleneglycol is desired substantially all of the alcohol groups, are oxidized to carboxylic acid groups. Acid-terminated polyalkyleneglycol-containing compound can also be made by Williamson ether synthesis where a polyalkyleneglycol is reacted with chloroacetic acid and/or esters in the presence of a base.

The epoxy resins used in producing the curing agent can be any reactive epoxy resin having a 1,2-epoxy equivalency (functionality), on the average, at least 1.3, preferably at least 1.6, to preferably to about 8 epoxide groups, to preferably 5 epoxide groups per molecule. The epoxy resin can be saturated or unsaturated, linear or branched, aliphatic, cycloaliphatic, aromatic or heterocyclic, and may bear substituents. Such substituents can include bromine or fluorine. They may be monomeric or polymeric, liquid or solid, but are preferably liquid or a low melting solid at room temperature. Suitable epoxy resins include glycidyl ethers prepared by reacting epichlorohydrin with a compound containing at least 1.5 aromatic hydroxyl groups carried out under alkaline reaction conditions. Examples of other epoxy resins suitable for use in the invention include diglycidyl ethers of dihydric compounds, epoxy novolacs and cycloaliphatic epoxies. Suitable epoxy resins are disclosed in U.S. Pat. No. 5,602,193, the disclosure is hereby incorporated by reference. Generally epoxy resins contain a distribution of compounds with a varying number of repeat units.

Preferably the epoxy resin is a diglycidyl ether of a dihydric phenol, diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl) propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols includes advancement products of the above diglycidyl ethers of dihydric phenols with dihydric phenols such as bisphenol-A, such as those described in U.S. Pat. Nos. 3,477,990 and 4,734,468, which are herein incorporated by reference.

Diglycidyl ethers of hydrogenated dihydric phenols can be produced, for example, by hydrogenation of dihydric phenols followed by glycidation reaction with an epihalohydrin in the presence of a Lewis acid catalyst and subsequent formation of the glycidyl ether by reaction with sodium hydroxide. Examples of suitable dihydric phenols are listed above.

Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. The aliphatic diol can be linear or branched or substituted with oxygen in the backbone. Examples of suitable aliphatic glycidyl ethers include for example, diglycidyl ethers of 1,4 butanediol, neopentyl glycol, cyclohexanedimethanol, hexanediol, polypropylene glycol, and like diols and glycols; and triglycidyl ethers of trimethylol ethane and trimethylol propane.

Epoxy novolacs can be produced by condensation of formaldehyde and a phenol followed by glycidation by reaction of an epihalohydrin in the presence of an alkali. The phenol group of the phenoxymethylene units of the epoxy novolac can be non-substituted, partially substituted or substituted up to three substitution with an alkyl group having 1 to 10 carbon atoms. The phenol can be for example, phenol, cresol, nonylphenol and t-butylphenol. Epoxy novolacs generally contain a distribution of compounds with a varying number of glycidated phenoxymethylene units, r, where r is generally 2 to 8. Generally, the quoted number of units is the number closest to the statistical average, and the peak of the distribution.

Cycloaliphatic epoxies can be produced by epoxidizing a cycloalkene-containing compound with greater then one olefinic bond with peracetic acid. Examples of cycloaliphatic epoxies include, for example, 3,4-epoxycyclo-hexylmethyl-(3,4-epoxy)cyclohexane carboxylate, dicycloaliphatic diether diepoxy [2-(3,4-epoxy) cyclohexyl-5,5-spiro(3,4-epoxy)-cyclohexane-m-dioxane], bis(3,4-epoxycyclohexylmethyl)adipate, bis(3,4-epoxycyclohexyl)adipate and vinylcyclohexene dioxide [4-(1,2-epoxyethyl)-1,2-epoxycyclohexane]. Cycloaliphatic epoxies include compounds of the formulas:

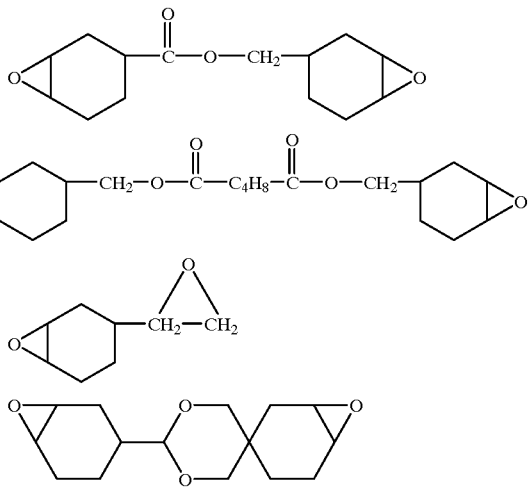

Commercial examples of preferred epoxy resins include, for example, EPON® Resins DPL-862, 828, 826, 825, 1001, 1002, EPONEX® Resin 1510, HELOXY® Modifiers 32, 44, 48, 56, 67, 68, 71, 84, 107, 505, EPON® Resin DPS155, and EPON® Resin HPT 1050 all available from Shell Chemical Company, Dow Chemical Epoxy Resin DEN 431 and Union Carbide Epoxy Resins ERL-4221, -4289, -4299, -4234 and -4206.

The monoepoxide capping agent can be an aliphatic, alicyclic, or aromatic compound attached to the epoxy functional group. Reacting the primary amine hydrogen reduces the chance for carbamate formation from atmospheric moisture reacting with the primary amine hydrogens, appearing as a blush on the coating and leading to chain scission. In addition to reducing the effect of blushing by reacting out some or all of the primary amine groups on the substituted aryl amidopolyamine, reacting the amidopolyamine with a epoxy functional group has the advantage of leaving the one free amine hydrogen active for reaction with epoxy groups. Reacting the primary amine on the amidopolyamine compound with a epoxy functionality, however, leaves the secondary amine hydrogen more active for reaction with an epoxy resin. Thus, one can achieve the dual advantage of reducing blush while retaining sufficient reactivity to cure the system at ambient temperatures in the absence of external catalysts. Reaction with a monoepoxide capping agent also leads to the formation of a hydroxyl group, which would also be available to react with the epoxy component.

Preferred examples of monoepoxide capping agents which are suitable for use in the invention include:

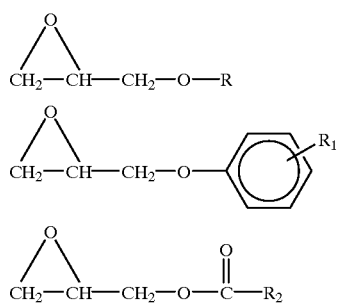

wherein R and $R_2$ are the same or different and are a branched or linear alkyl, an alkalicyclic, polyoxyalkyl, or alkenyl group having 2–100 carbon atoms, optionally branched,; and $R_1$ is hydrogen, halogen or a branched or unbranched alkyl having 1–18 carbon atoms. There may be more than one type of $R_1$ group attached to the aromatic ring.

These categories would include the unsaturated epoxy hydrocarbons of butylene, cyclohexene, styrene oxide and the like; epoxy ethers of monovalent alcohols such as methyl, ethyl, butyl, 2-ethylhexyl, dodecyl alcohol and others; epoxides of the alkylene oxide adducts of alcohols having at least 8 carbon atoms by the sequential addition of alkylene oxide to the corresponding alkanol (ROH), such as those marketed under the Neodol® name; epoxy ethers of monovalent phenols such as phenol, cresol, and other phenols substituted in the o-, m-, or p-positions with $C_{1-21}$ branched or unbranched alkyl, aralkyl, alkaryl, or alkoxy groups such as nonylphenol; glycidyl esters of monocarboxylic acids such as the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454, hereby incorporated by reference; epoxy esters of unsaturated alcohols or unsaturated carboxylic acids such as the glycidyl ester of neodecanoic acid, epoxidized methyl oleate, epoxidized n-butyl oleate, epoxidized methyl palmitoleate, epoxidized ethyl linoleate and the like; phenyl glycidyl ether; allyl glycidyl ethers, and acetals of glycidaldehyde.

Specific examples of monoepoxide capping agents useful to the practice of the invention include alkyl glycidyl ethers with 1–18 linear carbon atoms in the alkyl chain such as butyl glycidyl ether or a mixture of $C_8$-$C_{14}$ alkyls, cresyl glycidyl ether, phenyl glycidyl ether, nonylphenylglycidyl ether, p-tert-butylphenyl glycidyl ether, 2-ethylhexyl glycidyl ether, and the glycidyl ester of neodecanoic acid.

The curing agent of the invention can be useful to cure an liquid or a solid epoxy resin, neat, in organic solvents or in water. Any epoxy resin mentioned above to produce the curing agent of the invention can be cured by the curing agent of the invention. The curing agent can be useful for ambient coating applications as well as bake coating applications. The cure temperature can vary depending on the application, typically in the range of 5° C. to 200° C.

Further, the curing agent of the invention can be dispersed in an aqueous solution. Such dispersion contains water and the curing agent of the invention. Such composition can be provided by mixing the water in the curing agent of the invention before capping or after capping with or without the presence of a surfactant. Any conventional surfactant useful for emulsification or dispersion of curing agents in aqueous solutions can be used. Examples of such surfactant are surfactants based on polyalkylene oxide blocks such as Carbowax 8000, Pluronic 88, Novepox Tan 117 and Jeffamine ED2001. However, the curing agents of the invention are self-emulsifiable and do not need any additional surfactant (s) to provide the aqueous curing agent solution, emulsion or dispersion.

These curing agents of the invention can be used to effectively cure an aqueous epoxy resin system. Preferred examples of the aqueous epoxy resins are bisphenol-A based epoxy resins having from 350 to 10,000 molecular weight nonionically dispersed in water with or without glycol ether cosolvents. Commercial examples of the aqueous epoxy resins include, for example, EPI-REZ® Resin 3520, 3522, 3540 and 5522 available from Shell Chemical Company. The curing agents of the invention are compatible with aqueous dispersions without using acid salts. These curable systems contain, water, one or more epoxy resins and one or more curing agents of the invention. These aqueous curable epoxy resin systems can be cured at room temperature or at elevated temperatures or further catalyzed with a commercially available tertiary amine accelerator, such as 2,4,6-tris (dimethyl aminomethyl phenol) or phenols to cure at lower temperatures. Examples of such materials are EPI-CURE® Curing Agent 3253 from Shell Chemical Company or DMP-30 from Rohm and Haas. These low temperatures typically range from 5° C. to 20° C. For the aqueous epoxy resin systems, the typical cure temperature with or without an accelerator ranges from 5° C. to 45° C. Typically these curing agents are used to formulate thermoset coatings that have good corrosion protection of the coated substrate.

These aqueous epoxy resin systems can serve as components of paints and coatings for application to substrates such as, for example, metal and cementitious structures. To prepare such paints and coatings, these resins are blended with primary, extender and anti-corrosive pigments, and optionally, additives such as surfactants, antifoam agents, rheology modifiers and mar and slip reagents. The selection and amount of these pigments and additives depends on the intended application of the paint and is generally recognized by those skilled in the art.

The curing agents of the instant invention can also be used as components of adhesives and fiber sizing.

ILLUSTRATIVE EMBODIMENT

The following illustrative embodiments describe the novel epoxy resin composition of the invention and are provided for illustrative purposes and are not meant as limiting the invention.

The following ASTM methods were employed for the corresponding tests:

Particle Size

The determination of emulsion and dispersion particle sizes was accomplished with a Brookhaven Bi-DCP Particle Sizer from Brookhaven Instruments Corporation. Dn is number average particle size and Dw is mass average particle size. All particle size data is reported in microns, m. Unless otherwise stated the particle sizes quoted for the dispersions herein are reported as Dn, number average particle size.

Weight per Epoxide

The weight per epoxide (WPE or EEW) of all products was determined by drying a weighed amount of sample by means of azeotropic distillation with methylene chloride then titrating the residue by known methods and correcting for percent solids to determine the WPE at 100% solids content.

Amine Value

Defined as the milligrams of KOH equivalent to basic nitrogen content of a one-gram sample, determined by acid base titration.

Amine Eq. Wt.

Is defined as the weight required to react with one equivalent weight of epoxide and is determined from the amine nitrogen content in Shell Test Method HC-715-88 and the known stoichiometry of the reactants in the resulting product containing nitrogens with hydrogens that will react with epoxies under ambient conditions.

| | |
|---|---|
| Application viscosity, Stormer Krebs | D 562 |
| Film Hardness, pencil hardness | D 3363 |
| Solids Content | D 2369 |
| Specular Gloss | |
| Clear Films | D 1308 |
| Pigmented systems | D 4540 |
| Gloss/potlife | D 1308 |
| Film Thickness | B 499D measured with a Positector 6000 film thickness gauge |
| Impact resistance | D 2794-84 |
| Flexibility, Conical mandril | D 522 |
| Acid Value | D 1639 |
| Adhesion, X-cut | D 3359 |

EXAMPLE 1

An embodiment of the composition of the invention is provided.

Step 1: Dytek A (191.2 g), 2-methyl pentamethylene diamine from DuPont and an alpha-(2-carboxymethyl)-omega-methoxy-poly(oxy-1,2-ethanediyl) of 4522 equivalent weight made from the oxidation of methoxypolyethyleneglycol (5000 MW) produced as described in Example 1 of U.S. patent application Ser. No. 08/896,118 filed Jul. 17, 1997 (which is hereby incorporated by reference) were reacted for 5 hours at 190° C. under a $N_2$ atmosphere; afterwards, the excess amine was removed by vacuum distillation at reduced pressure. The product exhibited an amine equivalent weight of 4454.

Step 2: The amidoamine of step 1 (22.8 g) and 90.1 g of EPON* Resin 828 were reacted under $N_2$ for 2 hours at 80° C. The product was diluted with 50.0 g of toluene and the mixture was added within 20 minutes to PACM 20 (345.3 g) bis4-aminocyclohexylmethane from Air Products: at 80° C. The mixture was maintained at 80° C. for additional 1.5 hours. The amine equivalent weight at this point is 154. EPON Resin 828 is a diglycidyl ether liquid epoxy resin having WPE of 175–205, commercially available from Shell Chemical Company. (*Trademark of Shell).

Step 3: The amine adduct of step 2 (400.0 g) was warmed in a resin kettle under nitrogen atmosphere to 650° C. 255.0 g of deionized water was then added over one hour upon the completion of addition, the mixture had inverted to an oil-in water emulsion. The particle size of the emulsion was determined to be 1.29 microns.

COMPARATIVE EXAMPLE A

Comparison with U.S. Pat. No. 5,489,630 Example #6 is provided.

Step 1: Into a 500 ml flask equipped with a mechanical stirrer and additional funnel were placed 25.0 g of Ektasolve EP and 90.42 g of EPON Resin 828 (equivalent wt. 190). The addition funnel was charged with 25.0 g of Ektasolve EP and 170.3 g of Jeffamine M-2070 (from Huntsman). With stirring the amine was added to the epoxy resin over 10 minutes. The temperature was raised to 85 C and held at that temperature for 4 hours. The contents of the flask was then transferred to an additional funnel and the intermediate was then added to 324.4 g of PACM-20 which was pre-heated to 80 C. After 2 more hours at 80 C, the mixture was allowed to cool to room temperature and 96.3 g of Ektasolve EP, 2-propoxy ethanol from Union Carbide, was added to cut to 80% non volatile. The amine equivalent weight at this point was 229.3.

Step 2: 400 g of the amine adduct of step 1 was charged into a 1000 ml resin kettle equipped with a stirrer and placed on the dispenser. While stirring at 400 rpm, it was cut to 60% solids with 100 g of D. I. water. At 60% solids, it was a clear solution. The mixture was then cut to 50% solids with 140 g of D.I. water. It was still a clear solution. It was then cut to 45% solids with 71.7 g of D.I. water. It was still a clear solution. No emulsion or dispersion was observed.

EXAMPLES 2–7

Examples of the composition of the invention are provided. These emulsions were made in a similar manner to Example 1, except different polyamines in step 1 and 2 were used as listed in Table 1 and some products were end-capped as listed in Table 1. In step 1 excess amine was always used. Those end capped compositions were produced by adding monoepoxy listed in Table 1 in the amounts listed in Table 1 at the end of step 2 and heated to a temperature of 50–100° C. until essentially all of the epoxy groups were consumed. The products produced an amine equivalent weight as indicated above. MXDA=m-xylylenediamine from Mitsubishi Gas; D-230=amine-terminated polypropyleneglycol having approximate molecular weight of 230 from Huntsman (Jeffamine D-230); 1,3-BAC=1,3-diaminocyclohexene from Mitsubishi Gas; CGE=cresol glycidyl ether (HELOXY* 62 Modifier from Shell Chemical Company), AGE=$C_{12}$-$_{14}$ monoglycidyl ether (HELOXY* 9 Modifier from Shell Chemical Company), PACM-20=para-aminodicyclohexyl methane from Amicure. *Trademark of Shell.

EXAMPLE 8

Step 1: Dytek A (348.6 g), 2-methyl pentamethyllene diamine from Du Pont and a bis-2-carboxymethyl-polyethylene glycol of 2872 equivalent weight made from the oxidation of polyethylene glycol (4600 MW) produced as described in Example 1 of U.S. Pat. No. 5,602,193 except the molecular weight of the polyethylene glycol were reacted for 5 hours at 190° C. under a N2 atmosphere; afterwards, the excess amine was removed by vacuum distillation at reduced pressure. The product exhibited an amine equivalent weight of 2998.

Step 2: The amidoamine of step 1 (25.0 g) and 149.2 g of EPON Resin 828 were reacted under $N_2$ for 2 hours at 120° C. The product was diluted with 110 g of toluene and the mixture was added at a rate to maintain the exotherm at 110–115 C to 362.4 g of Dytek A. The mixture was maintained at 115 C for additional 2 hours. The toluene and excess diamine were then removed by vacuum distillation. 220.2 g of HELOXY 9 Modifier (AGE) was then added over 1 hour. After addition, the mixture was held at 115 C for another 2 hrs. The amine equivalent number at this point is 357.

Step 3: The amine adduct of step 2 (400 g) was warmed in a resin kettle under nitrogen atmosphere to 75 C. 328.0 g of deionized water was then added over one hour. Upon the completion of addition, the mixture had inverted to an oil-in-water emulsion. The particle size of compulsion was determined to be 0.25 microns.

Disperbyk 190 from Byk Chemie, 0.3% based on pigment weight. This pigment paste was added to the epoxy dispersion prepared above in an amount to obtain a pigment to resin loading of 0.8 to 1.0 along with an appropriate amount of deionized water to reach 65 to 70 KU and allowed to deair overnight (8% of the weight of the epoxy dispersion). The next day the Example 8 curing agent and the pigmented epoxy dispersion were combined at a one to one amine hydrogen to epoxy and after approximately 30 minutes the resulting paint was spray applied to iron phosphate treated cold rolled steel test panels. After one week cure at 77 degree F and 50% relative humidity the following paint properties were measured. Chemical resistance of the white paint using the curing agent of the invention, water resistance and base resistance, were much better. Acid resistance was about equal.

TABLE 1

| Ex. | % NV | PRODUCT AMINE EQ. WT.*** | PARTICLE SIZE | WT %** AMINE STEP 2 | WT. %* AMIDO- AMINE | STEP 2 AMINE TYPE | STEP 1 AMINE TYPE | END CAP Wt. % |
|---|---|---|---|---|---|---|---|---|
| 2 | 50.9 | 248 | 0.43 μm | 26 | 10 | MXDA | 1,3-BAC | PGE 28% |
| 3 | 42.8 | 248 | 0.47 μm | 28 | 5.7 | MXDA | 1,3-BAC | PGE 27.8% |
| 4 | 65 | 321 | 1.46 μm | 35 | 7.6 | D-230 | Dytek A | CGE 28% |
| 5 | 40 | 352 | 0.47 μm | 31 | 6.7 | Dytek A | Dytek A | AGE 37% |
| 6 | 45 | 313 | 0.65 μm | 52 | 7.3 | PACM-20 | Dytek A | PGE 12% |
| 7 | 60 | 154 | 0.99 μm | 75 | 5 | PACM-20 | Dytek A | None |
| 8 | 55 | 337 | 0.25 μm | 24 | 5 | Dytek A | Dytek A | AGE 42% |

*Based on weight of non-volatile for step 2.
**Weight percent amine based on weight of non-volatile for step 2.
***Before addition of water.
****Calculated values.

EXAMPLE 9

Paint Formulation: White TiO2 Enamel of Example 8 Curing Agent and EPI-REZ Waterborne Resin 5522 above mentioned curing agents of the invention can be readily mixed with any commercially available epoxy dispersion and can be applied as coatings. In Table 2 below an overview is given on the properties of curing agents of the invention (example 8) cured with epoxy resin dispersion EPI-REZ Waterborne Resin 5522 ("ER 5522"). As comparison, a commercial formulation with curing agent, EPI-CURE* Curing Agent 8290 ("EC 8290", a water soluble curing agent based on polyamine) from Shell Chemical Company, is provided in the tables below. EPI-REZ* Resin 5522 (an aqueous modified epoxy resin dispersion of diglycidylether of bisphenol-A having EEW of 625) available from Shell Chemical Company. (*Trademark of Shell.)

This paint was prepared by first making a pigment paste of titanium dioxide in water using a commercial dispersant,

TABLE 2

| Paint Property | Formulation 1 ER 5522/Ex. 8 | ER5522/EC8290 |
|---|---|---|
| Dry Film Thickness | 2.3 mil | 1.9 |
| Pencil Hardness | 2B | H |
| Direct Impact | 104 | 28 |
| Reverse Impact | 124 | 0 |
| Adhesion X cut | 5A | 5A |
| MEK Double Rubs | 102 | >200 |
| 20 degree/60 degree gloss | 21/67 | 14/62 |
| Conical Mandril Flexibility | 32% | 32% |

From the above results, where an experimental curing agent dispersion has been pigmented and mixed with an epoxy resin dispersion, and subsequently compared to a commercially available waterborne formulation of which the paint preparation was exactly similar, the following conclusions can be drawn: the new experimental system is at least comparable in performance and even outperforms the commercial system on flexibility and chemical resistance. In addition to this excellent performance the advantage for the experimental system is it's very low VOC: a value of about 100 g/L or 1.0 lbs/gal in comparison to 240 g/L or 2 lbs/gal for the commercial systems.

We claim:
1. An aqueous curable epoxy resin system comprising:
(a) water,
(b) at least one epoxy resin; and
(c) a curing agent comprising a reaction product having an amine equivalent weight of at least 50 prepared by the steps comprising
  (i) reacting
    (A) an epoxy-functional compound prepared by reacting an amidoamine having the formula:

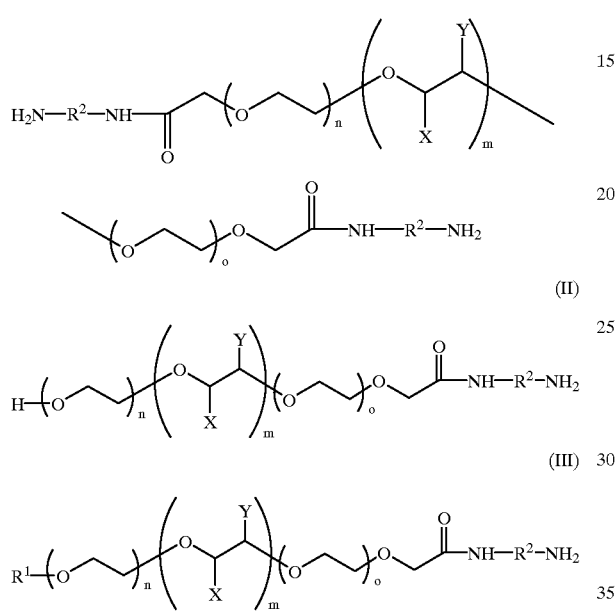

wherein $R^1$ is an alkyl, aryl, or arylalkyl group having 1 to 15 carbon atoms, $R^2$ is aliphatic, cycloaliphatic, or aromatic group having 2 to 18 carbon atoms optionally containing non-reactive oxygen or at most an average of 4 secondary and/or tertiary nitrogen atoms per structure in the backbone, X and Y are independently a hydrogen, methyl or ethyl group with the provision that X or Y is hydrogen, then the other of X or Y is methyl or ethyl and n+m+o is a real number from 65 to 200, and n, m, and o are each a real number such as to provide a number average molecular weight of the amidoamine from 3000 to 10,000, and n+o is within the range of from 80 percent to 100 percent of n+m+o, in a ratio of (I) to (II) by weight in the range of 100:0 to 0:100, in a ratio of (I) to (III) by weight in the range of 100:0 to 0:100, and in a ratio of (II) to (III) by weight in the range of 100:0 to 0:100, and at least one epoxy resin having a functionality of from 1.5 to 2.5 epoxide group per molecule in an active amine hydrogen atoms to epoxy groups ratio of from 1:350 to 1:15, said epoxy resin is a glycidyl ether containing aliphatic, cycloaliphatic, or aromatic moieties, and
    (B) at least one polyamine in an active amine hydrogen atoms to epoxy groups ratio of 2:1 to 30:1 thereby producing an amine-terminated product having a amine equivalent weight of at least 50; and
  (ii) reacting the amine-terminated product with (C) a monoepoxy in a remaining active amine hydrogen atoms to epoxy groups ratio of 5:1 to 20:1.
2. A cured composition of claim 1.
3. The aqueous curable epoxy resin system of claim 1 wherein the amidoamine used to prepare the epoxy-functional component (A) is of structures (I) and (II) wherein the ratio of (I) to (II) by weight is in the range of 99:1 to 1:99.
4. The aqueous curable epoxy resin system of claim 3 wherein the polyamine component has the formula:

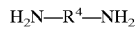

wherein $R^4$ is aliphatic, cycloaliphatic, or aromatic group having 2 to 18 carbon atoms optionally containing non-reactive oxygen or at most an average of 4 secondary and/or tertiary nitrogen atoms per structure in the backbone.
5. The cured composition of claim 4.

* * * * *